(12) United States Patent
Suzuoki et al.

(10) Patent No.: US 11,120,613 B2
(45) Date of Patent: Sep. 14, 2021

(54) IMAGE GENERATING DEVICE AND METHOD OF GENERATING IMAGE

(71) Applicant: Sony Interactive Entertainment Inc., Tokyo (JP)

(72) Inventors: Masakazu Suzuoki, Tokyo (JP); Yuki Karasawa, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 16/474,322

(22) PCT Filed: Feb. 9, 2018

(86) PCT No.: PCT/JP2018/004582
§ 371 (c)(1),
(2) Date: Jun. 27, 2019

(87) PCT Pub. No.: WO2018/151038
PCT Pub. Date: Aug. 23, 2018

(65) Prior Publication Data
US 2019/0340807 A1 Nov. 7, 2019

(30) Foreign Application Priority Data

Feb. 17, 2017 (JP) .............................. JP2017-028488

(51) Int. Cl.
*G06T 7/00* (2017.01)
*G06T 15/20* (2011.01)
*G06T 7/50* (2017.01)

(52) U.S. Cl.
CPC ................ *G06T 15/20* (2013.01); *G06T 7/50* (2017.01); *G06T 7/97* (2017.01); *G06T 2207/10028* (2013.01)

(58) Field of Classification Search
CPC ............. A63F 2300/8082; G06F 3/011; G06F 3/0346; G06T 7/50; G06T 7/579;
(Continued)

(56) References Cited

U.S. PATENT DOCUMENTS 5,710,875 A   1/1998 Harashima
7,286,143 B2  10/2007 Zitnick, III
(Continued)

FOREIGN PATENT DOCUMENTS

JP        0877356 A    3/1996
JP     2002042158 A    2/2002
(Continued)

OTHER PUBLICATIONS

Pujades Rocamora, "Camera Models and algorithms for 3D video content creation", Image Processing, Universite Grenoble Alpes, 2015, English (Year: 2015).*

(Continued)

*Primary Examiner* — Diane M Wills
(74) *Attorney, Agent, or Firm* — Matthew B. Dernier, Esq.

(57) ABSTRACT

To achieve a balance between responsiveness of image display with respect to movement of a viewing point, and image quality. Reference viewing points are set in respect of a space containing an object to be displayed, and images of the space as viewed from these respective reference viewing points are created as reference images. Meanwhile, when pixel values of display images from a virtual camera are determined, reference images are selected wherein a point on the object represented by the pixel in question is represented as an image, and the values of these pixels are combined using a rule based on the positional relationship etc. of the reference viewing points with the virtual camera.

14 Claims, 7 Drawing Sheets

(58) Field of Classification Search
CPC . G06T 7/90; G06T 7/97; G06T 11/001; G06T 15/04; G06T 15/20; G06T 19/00; G06T 19/006; G06T 2207/10024; G06T 2207/10028; G06T 2207/10016; G06T 2207/201
See application file for complete search history.

(56) References Cited

U.S. PATENT DOCUMENTS

| | | | |
|---|---|---|---|
| 2001/0043739 A1 | 11/2001 | Oshino | |
| 2005/0285875 A1 | 12/2005 | Zitnick, III | |
| 2005/0286759 A1* | 12/2005 | Zitnick, III | G06T 7/596 382/154 |
| 2007/0296721 A1 | 12/2007 | Chang | |
| 2010/0254627 A1* | 10/2010 | Panahpour Tehrani | G06T 15/205 382/285 |
| 2015/0054913 A1 | 2/2015 | Annau | |
| 2016/0042551 A1* | 2/2016 | Imber | G06T 15/50 345/426 |
| 2016/0252730 A1 | 9/2016 | Ikeda | |
| 2016/0335792 A1* | 11/2016 | Forutanpour | G06T 11/001 |

FOREIGN PATENT DOCUMENTS

| | | | |
|---|---|---|---|
| JP | 2011165081 A | | 8/2011 |
| KR | 100603601 B1 | | 7/2006 |
| KR | 101066550 A | | 9/2011 |
| KR | 101203243 B1 | | 11/2012 |

OTHER PUBLICATIONS

Yamaguci, Tatsuhisa, 3D Video Capture of a Moving Object in a Wide Area Using Active Cameras, Thesis, Kyoto University 2013 (Year: 2013).*
International Preliminary Report on Patentability and Written Opinion for corresponding PCT Application No. PCT/JP2018/004582, 15 pages, dated Aug. 29, 2019.
International Search Report for corresponding PCT Application No. PCT/JP2018/004582, 3 pages, dated Mar. 13, 2018.
Tomite, Kaname et al. Arbitrary Viewpoint Rendering from Multiple Omnidirectional Images for Interactive Walkthroughs. ITE Technical Report) vol. 26, No. 9, pp. 65-70, Jan. 30, 2002 (see English abstract).
Notice of Preliminary Rejection for corresponding KR 10-2019-7022798, 16 pages, dated Oct. 6, 2020.
Extended European Search Report for corresponding EP Application 18753641.2, 12 pages, dated Nov. 26, 2020.
Grant of Patent for corresponding KR Application 10-2019-7022798, 4 pages, dated Jan. 22, 2021.
Kaname Tomite, et al., "Arbitrary Viewpoint Rendering from Multiple Omnidirectional Images for Interactive Walkthroughs" Graduate School of Information Science, Nara Institute of Science and Technology, 4 pages, dated Dec. 10, 2002.

* cited by examiner

IMAGE GENERATING DEVICE AND METHOD OF GENERATING IMAGE

TECHNICAL FIELD

The present invention relates to an image generating device that generates a display image commensurate with a viewing point and to a method of generating an image.

BACKGROUND ART

Image display systems whereby a subject space can be viewed from any viewing point are common. For example, systems have been developed whereby a panoramic image is displayed on a head-mounted display and the system is arranged in such a way that the panoramic image is displayed correspondingly with the direction of the line of sight, when a user who is wearing the head-mounted display turns his/her head. By making use of the head-mounted display, the sense of immersion in the image is heightened and ease of operation of applications such as games can be improved. Walk-through systems have also been developed whereby a user who is wearing the head-mounted display can virtually walk, by physical movement, around the interior of a space that is displayed as an image.

SUMMARY

Technical Problems

Depending on the type of display device, in image display technology for adapting to any viewing point, high responsiveness to changes in display resulting from movement of the viewing point is required. On the other hand, in order to heighten the sense of presence in the image world, resolution must be raised, and complicated calculations must be performed: these increase the image processing load. This means that the image cannot keep pace with movement of the viewing point and as a result the feeling of presence may be impaired.

The present invention has been made in view of these problems, the aim thereof being to provide technology capable of achieving a balance between responsiveness of the image display with respect to the viewing point, and image quality.

Solution to Problems

In order to solve the aforementioned problems, an aspect of the present invention relates to an image generating device. This image generating device includes a reference image data storage section that stores data of a reference image representing an image when a space including an object to be displayed is viewed from a prescribed reference viewing point, a viewing point information acquisition section that acquires information relating to a viewing point, a projection section that represents on a plane of a display image the position and shape of an image of the object when the space is viewed from the viewing point, a pixel value determination section that determines values of pixels constituting the image of the object in the display image, using values of pixels representing a same image in the reference image, and an output section that outputs the data of the display image.

Here, the "prescribed reference viewing point" is a prescribed number of one or more viewing points that are set by prescribed positional coordinates or a prescribed distribution rule in the aforementioned space, and the number and/or position thereof may be fixed or may change over time in accordance with, for example, changes occurring in the space.

A different aspect of the present invention relates to a method of generating an image. This method of generating an image generates a display image representing a space including an object to be displayed and includes a step of acquiring information relating to a viewing point, a step of representing on a plane of a display image a position and a shape of an image of the object when the space is viewed from the aforementioned viewing point, a step of reading data of a reference image in question from a memory that stores the data of reference images that represent an image when the space is viewed from a prescribed reference viewing point, and determining values of pixels constituting the image of the object in the display image, using values of pixels representing a same image in the reference image, and a step of outputting data of the display image.

It should be noted that any combinations of the foregoing constituent elements, or changes in expression of the present invention among, for example, methods, devices, systems, computer programs, data structures or recording media are also valid aspects of the present invention.

Advantageous Effect of Invention

According to the present invention, it is possible to achieve a balance between responsiveness of image display with respect to a viewing point, and image quality.

DESCRIPTION OF EMBODIMENTS

The present embodiment basically displays an image in a field of view commensurate with a user's viewing point. For this reason, there is no particular restriction on the type of device used to display the image and any of a wearable display, flat panel display or projector or the like could be employed; however, in the present embodiment, a head-mounted display is described as an example of a wearable display.

In the case of a wearable display, the user's line of sight can be roughly inferred by an incorporated motion sensor. In the case of other display devices, the line of sight can be detected by the user wearing a motion sensor on the head, or by detecting reflection of infrared rays using a gazing point detection device. Alternatively, a marker may be mounted on the user's head and the line of sight may be inferred by analyzing an image in which the attitude of this marker is picked up, or by any combination of such technology.

Figure 1:
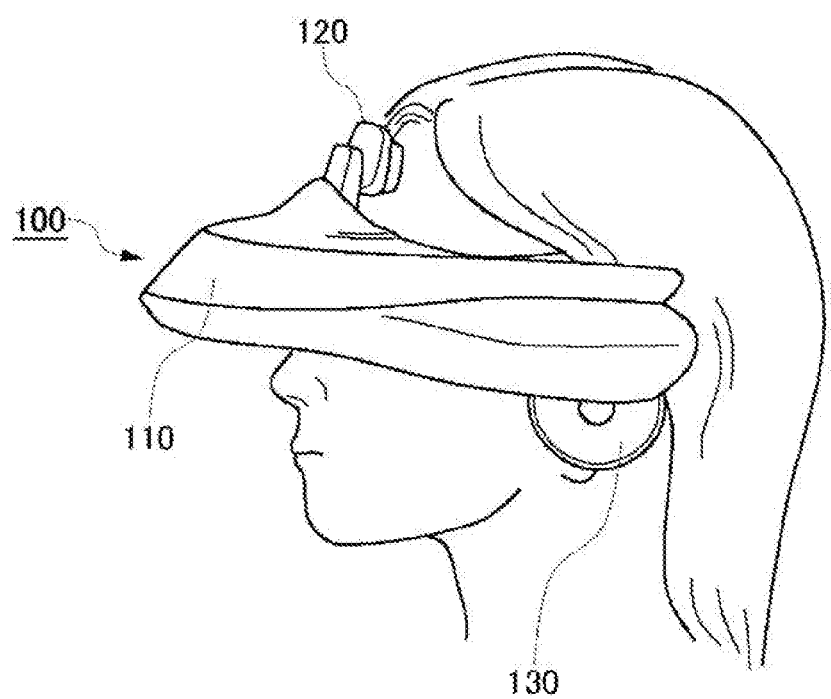
FIG. 1 is a view depicting an example of an external view of a head-mounted display according to the present embodiment.

FIG. 1 depicts an example of an external view of a head-mounted display 100. The head-mounted display 100 includes a main unit 110, a front head-portion contact section 120, and a side head-portion contact section 130. The head-mounted display 100 is a display device worn on the user's head to provide an appreciation of static images or video or the like displayed on a display, and to enable listening to voice or music etc. output from headphones. By means of the motion sensor that is incorporated in the head-mounted display 100 or externally attached thereto, attitude information as to the angle of rotation or inclination of the user's head on which the head-mounted display 100 is worn can be measured.

The head-mounted display 100 is an example of a "wearable display device." A wearable display device is not restricted to head-mounted displays 100 in the narrow sense, but also includes display devices capable of being worn in any fashion, such as spectacles, spectacles-type displays, spectacles-type cameras, headphones, headsets (headphones fitted with a microphone), earphones, earrings, ear-mounted cameras, caps, caps fitted with a camera, or hairbands.

Figure 2:
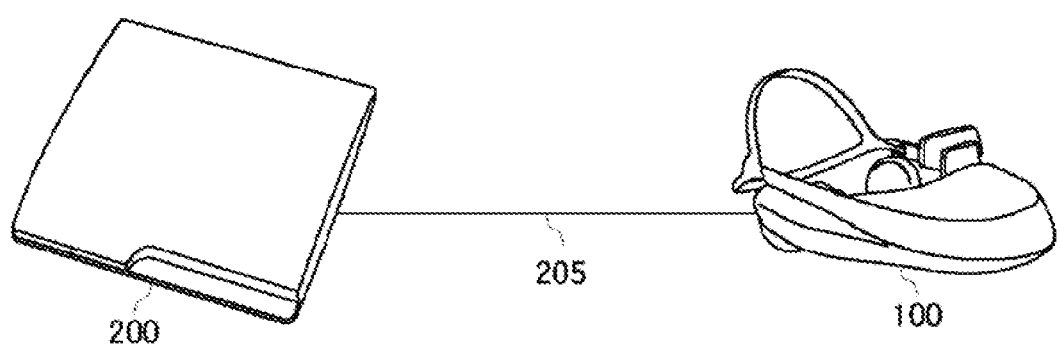
FIG. 2 is a layout diagram of an information processing system according to the present embodiment.

FIG. 2 is a layout diagram of an information processing system according to the present embodiment. The head-mounted display 100 is connected with an image generating device 200 by an interface 205 used to connect peripherals such as wireless communication or a universal serial bus (USB). The image generating device 200 may additionally be connected with a server through a network. In this case, the server may provide to the image generating device 200 an online application such as a game in which a number of users can participate through the network.

The image generating device 200 specifies the position of the viewing point and/or the direction of the line of sight in accordance with the position and attitude of the user's head on which the head-mounted display 100 is worn, and generates a display image such as to present a commensurate field of view, and outputs this to the head-mounted display 100. In this regard, the image display may have various objectives. For example, the image display device 200 may generate a virtual world constituting the stage of a game as a display image whilst the electronic game progresses, or may display a static image or video image whereby a virtual world may be appreciated independently of the real world. If the display device is a head-mounted display, a state of immersion in the displayed world can be produced by ensuring that a panoramic image can be displayed with a wide angular range centered on the viewing point.

Figure 3:
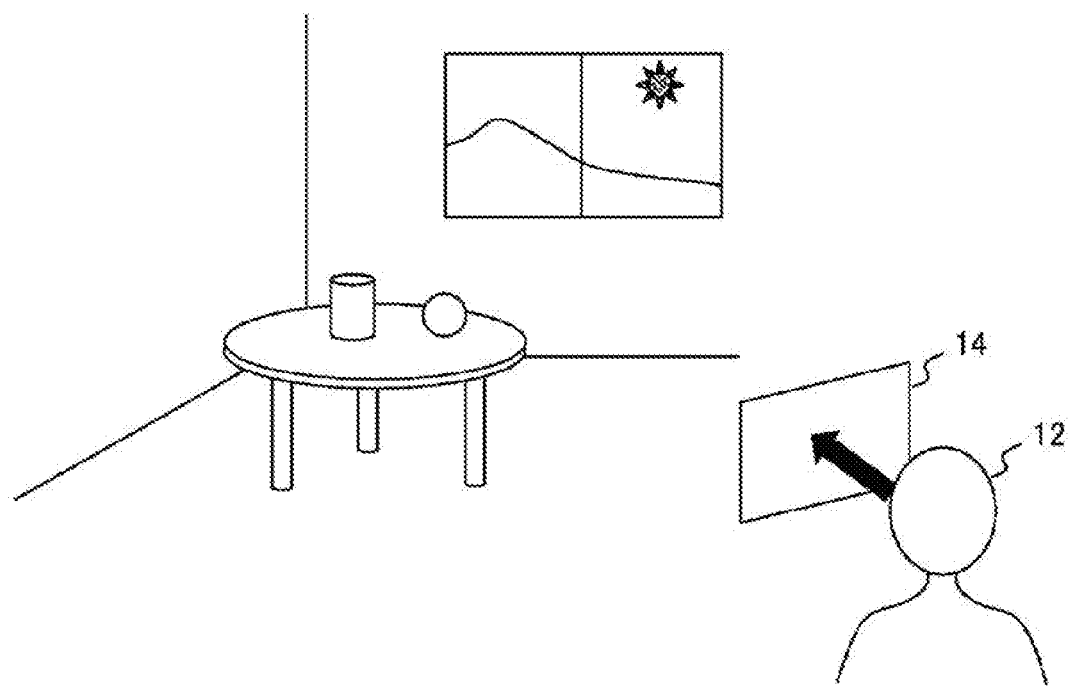
FIG. 3 is a view given in explanation of an example of an image world displayed by an image generating device according to the present embodiment on a head-mounted display.

FIG. 3 is a view given in explanation of an example of an image world displayed on the head-mounted display 100 by the image generating device 200 in accordance with the present embodiment. In this example, a state of a user 12 being in a room constituting a virtual space is created. Objects such as the walls, floor, window, a table and articles on the table are arranged as depicted in the drawing in the world coordinate system that defines the virtual space. The image generating device 200 defines a view screen 14 in accordance with the position of the viewing point of the user 12 and the direction of the user's line of sight in this world coordinate system, and draws the display image by projecting images of the objects thereon.

If the position of the viewing point of the user 12 and the direction of the user's line of sight (hereinbelow these may be sometimes referred to inclusively as "viewing point") are acquired at a prescribed rate and the position and direction of the view screen 14 are changed in accordance therewith, the image can be displayed with a field of view corresponding to the user's viewing point. If stereo images are generated having parallax, and are displayed in front of the left and right eyes in the head-mounted display 100, the virtual space can also be viewed three-dimensionally. In this way, the user 12 can experience virtual reality as if the user were immersed in the room of the display world. It should be noted that, although in the illustrated example the display image represents a virtual world based on computer graphics, the display image could be an image of the real world picked up by panoramic photography etc., or a virtual world could be combined therewith.

In order to confer a sense of presence in this display, the physical image that is generated in the display space is preferably made to accurately reflect the display subject as far as possible. For example, changes in hue or brightness of the object surface resulting from movement of the viewing point can be represented more realistically by accurately calculating the propagation of various light reaching the eye, such as diffusion/reflection or mirror reflection at the object surface, or ambient light. One typical technique for achieving this is ray tracing. However, carrying out such physical calculations with high precision may involve a non-negligible latency before display in particular in environments where the user is allowed to freely select the viewing point.

Accordingly, in this embodiment, images seen from specified viewing points are acquired beforehand and used to determine the pixel values of the display image for any viewing point. Specifically, the color of an object displayed as an image in the display image is determined by extracting same from the corresponding location in an image acquired beforehand. Hereinbelow, the viewing point that is set in the prior image acquisition will be referred to as the "reference viewing point" and the image that is acquired beforehand, as seen from the reference viewing point, will be referred to as the "reference image." Latency from movement of the viewing point until display can be reduced by acquiring some of the data used for drawing the display image beforehand, as a reference image. Also, since there are essentially no time restrictions regarding acquisition of the reference image, physical calculations such as ray tracing can be performed with high precision, over time.

By setting a plurality of reference viewing points distributed in the range assumed to be available for movement of the viewing point during display, and preparing respective reference images therefor, the coloration of the same object as seen from a plurality of viewing points can be taken into account, making it possible to represent the object with even higher accuracy, in accordance with the viewing point during display. More specifically, if the viewing point during display coincides with one of the reference viewing points, the pixel values of the reference image corresponding to this reference viewing point can be directly adopted. If the viewing point during display is among a plurality of reference viewing points, the pixel values of the display image are determined by combining the pixel values of the reference images corresponding to the plurality of reference viewing points in question.

Figure 4:
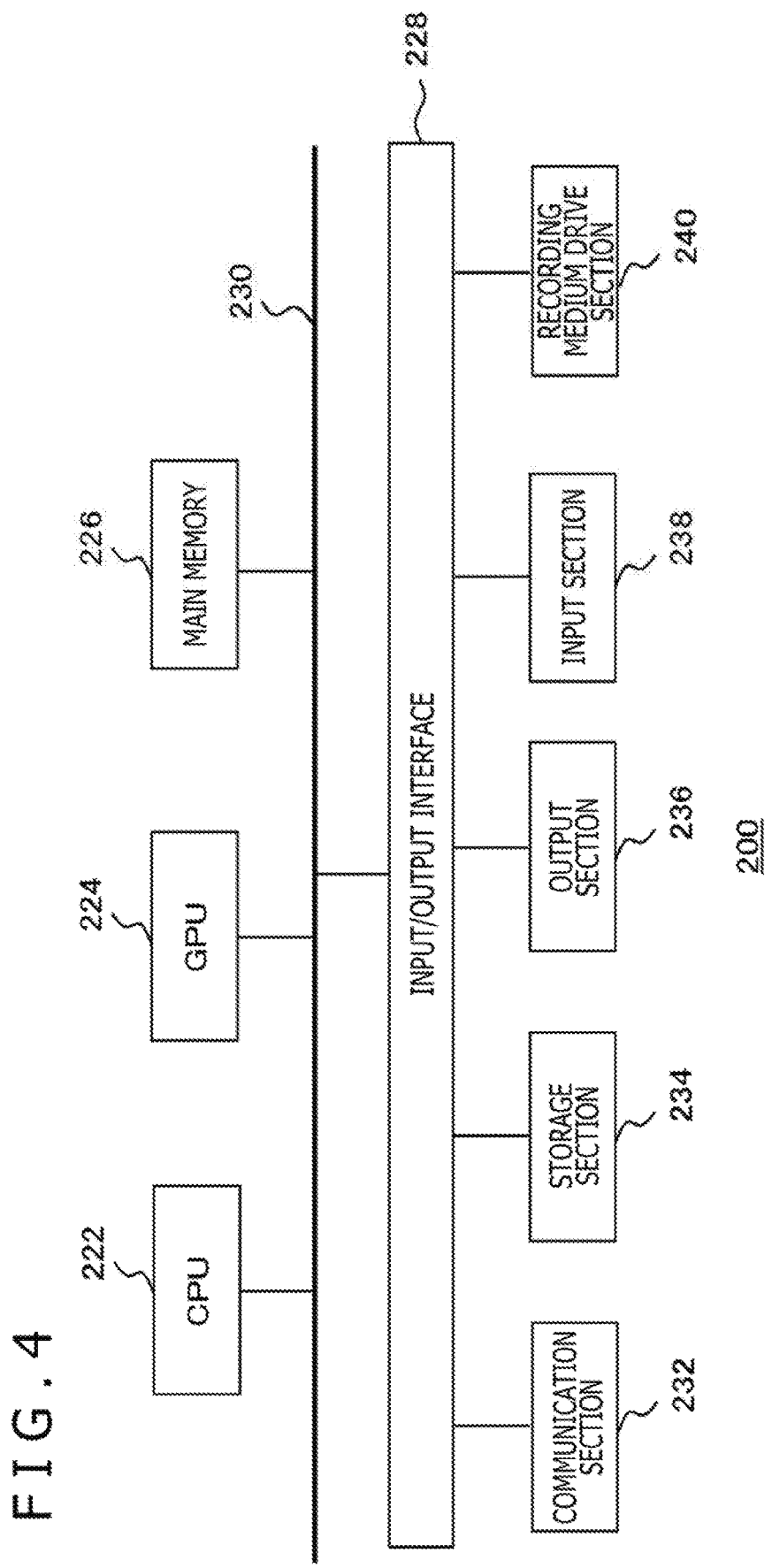
FIG. 4 is a view depicting the internal circuit layout of an information processing device according to the present embodiment.

FIG. 4 depicts the internal circuit layout of the image generating device 200. The image generating device 200 includes a central processing unit (CPU) 222, a graphics processing unit (GPU) 224 and a main memory 226. These various sections are mutually connected by way of a bus 230. In addition, an input/output interface 228 is connected with the bus 230.

With the input/output interface 228, there are connected a communication section 232 including a peripheral interface such as a USB or Institute of Electrical and Electronics Engineers (IEEE) 1394 or a wired or wireless local area network (LAN) network interface, a storage section 234 such as a hard disk drive or non-volatile memory, an output section 236 that outputs data to a display device such as the head-mounted display 100, an input section 238 that inputs data from the head-mounted display 100, and a recording medium drive section 240 that drives a removable recording medium such as a magnetic disk, an optical disk or a semiconductor memory.

The CPU 222 controls the entire image generating device 200 by running the operating system stored in the storage section 234. The CPU 222 also executes various programs read from the removable recording medium and loaded into the main memory 226 or downloaded through the communication section 232. The GPU 224 has the function of a geometry engine and the function of a rendering processor; it performs drawing processing in accordance with drawing commands from the CPU 222 and stores the display image in a frame buffer, not depicted. The display image stored in the frame buffer is then converted to a video signal and output to the output section 236. The main memory 226 includes a random access memory (RAM) and stores the programs and data required for processing.

Figure 5:
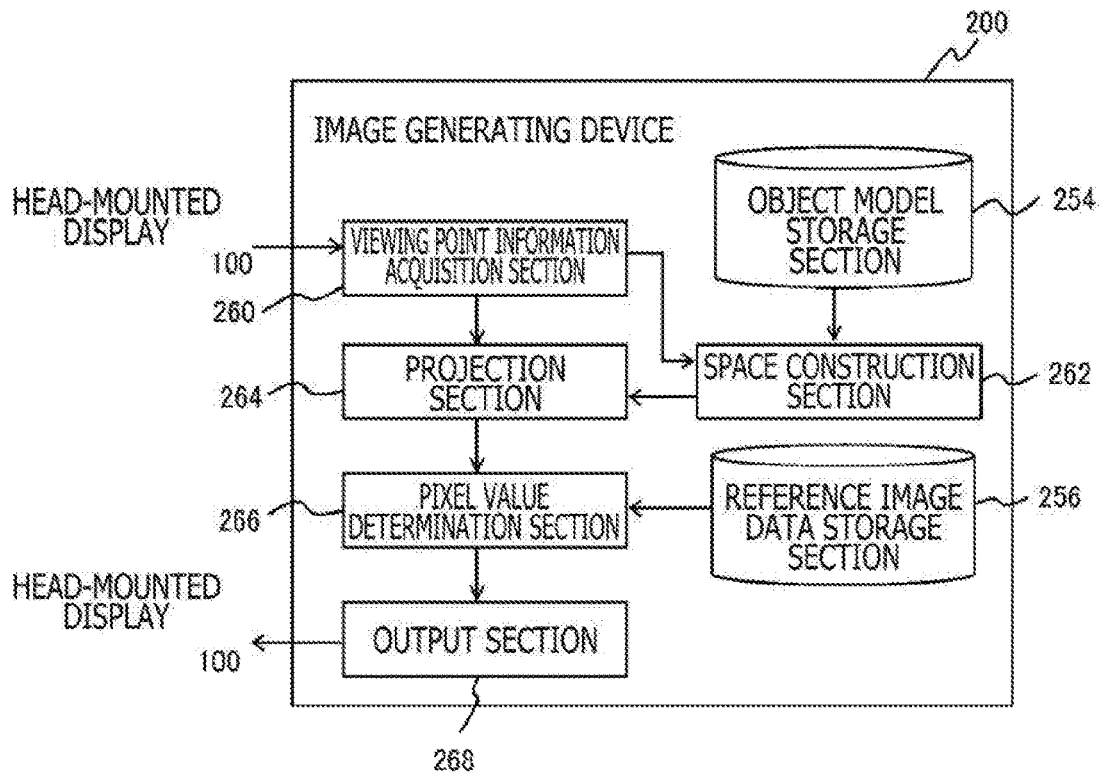
FIG. 5 is a view depicting functional blocks of an image generating device according to the present embodiment.

FIG. 5 depicts the functional blocks of the image generating device 200 in the present embodiment. As described above, the image generating device 200 should perform general information processing such as advancing the progress of an electronic game or communicating with the server, but FIG. 5 focuses in particular on the function of generating data of the display image commensurate with the viewing point. It should be noted that at least some of the functionality of the image generating device 200 depicted in FIG. 5 may be installed in the head-mounted display 100. Alternatively, at least some of the functionality of the image generating device 200 may be installed on the server that is connected with the image generating device 200 through the network.

Also, regarding the functional blocks depicted in FIG. 5 and FIG. 6, to be described later, in hardware terms, these can be implemented by constituent elements such as the CPU, the GPU, and various memories depicted in FIG. 4, and, in software terms, can execute programs loaded into memory from, for example, a recording medium and demonstrating various functions such as a data input function, data holding function, image processing function, or communication function. As is understood by persons skilled in the art, these functional blocks can be realized in various forms exclusively by hardware, exclusively by software, or by a combination thereof, and there is therefore no restriction to any of these forms.

The image generating device 200 includes a viewing point information acquisition section 260 that acquires information relating to the user's viewing point, a space construction section 262 that constructs the space including the objects to be displayed; a projection section 264 that projects an object onto a view screen, a pixel value determination section 266 that determines the value of the pixels constituting the image of an object and thereby completes the display image, and an output section 268 that outputs the data of the display image to the head-mounted display 100. The image generating device 200 further includes an object model memory section 254 that stores data relating to object models required for the construction of the space, and a reference image data storage section 256 that stores the data of the reference images.

The viewing point information acquisition section 260 includes the input section 238, the CPU 222, and so on of FIG. 4, and acquires the position of the user's viewing point and/or the direction of the user's line of sight at a prescribed rate. For example, it successively acquires the output values of an acceleration sensor incorporated in the head-mounted display 100 and thereby acquires the attitude of the head. In addition, the position of the head in real space is acquired by providing a light-emitting marker, not depicted, on the outside of the head-mounted display 100, and acquiring a captured image thereof from an image pickup device, not depicted.

Alternatively, the position and/or attitude of the head could be acquired by a technique such as simultaneous localization and mapping (SLAM), by providing an image pickup device, not depicted, that picks up an image corresponding to the field of view of the user, on the head-mounted display 100 side. Once the position and/or attitude of the head has been acquired in this way, the position of the user's viewing point and direction of the user's line of sight can be approximately specified. It will be understood by persons skilled in the art that various techniques for acquiring information relating to the user's viewing point are feasible and are not restricted to the case where the head-mounted display 100 is employed.

The space construction section 262 includes the CPU 222, the GPU 224, the main memory 226, and so on of FIG. 4, and constructs a shape model of the space in which the objects to be displayed are present. In the example depicted in FIG. 3, objects such as walls, the floor, a window, a table and articles on the table, representing the interior of a room, are arranged in a world coordinate system defining a virtual space. Information relating to the shape of the individual objects is read from the object model storage section 254. The space constructed by the space construction section 262 may be fixed or may be changed in accordance with the progress of, for example, a game.

Here, the space construction section 262 should determine the shape, position and attitude of the objects and may employ modelling techniques based on surface models in ordinary computer graphics. The projection section 264 may include the GPU 224, the main memory 226, and so on of FIG. 4, and sets a view screen in accordance with the viewing point information acquired by the viewing point information acquisition section 260. Specifically, the display space is drawn on a plane of the screen with a field of view commensurate with the position of the user and/or direction faced by the user, by setting the screen coordinates in correspondence with the position of the user's head and/or the direction in which the user's face is facing.

In addition, the projection section 264 projects objects in the space constructed by the space construction section 262 onto the view screen. This processing can also utilize ordinary computer graphics techniques for perspective conversion of, for example, a polygon mesh. The pixel value determination section 266 includes the GPU 224, the main memory 226, and so on of FIG. 4, and determines the values of the pixels constituting the image of the object that is projected onto the view screen. As described above, at this point, the data of the reference image is read from the reference image data storage section 256, and the values of pixels representing points on the same object are extracted and employed.

For example, corresponding pixels are specified from the reference image generated in respect of a reference viewing point around the actual viewing point, and are used as pixel values of the display image, by averaging with weighting based on the distance and/or angle of the actual viewing point and the reference viewing point. By generating accurate reference images beforehand over time by means of a method such as ray tracing, image representation can be realized with high precision during operation, close to when ray tracing is employed, but with calculation that imposes little load, namely, reading the corresponding pixel values and performing weighted averaging.

Preferably the reference viewing points are distributed so as to cover the range of possible movement of the user's viewing point. It should be noted that the reference images are not restricted to graphics images drawn by ray tracing, but could be, for example, images obtained by photographing the real space from the reference viewing points beforehand. In this case, the space construction section 262 constructs a shape model of the real space photographed, and the projection section 264 projects this shape model onto the view screen in accordance with the viewing point during display. Alternatively, if the position of the image of the object that is being photographed can be determined in the field of view corresponding to the viewing point during display, the processing by the space construction section 262 and projection section 264 can be dispensed with.

It should be noted that, in the case where the display image is viewed stereoscopically, the projection section 264 and the pixel value determination section 266 may perform respective processing in respect of the viewing points of the left eye and right eye. The output section 268 includes the CPU 222, the main memory 226, output section 236, and so on of FIG. 4 and delivers data of the display image that has been completed as a result of the pixel value determination section 266 determining the pixel values to the head-mounted display 100 at a prescribed rate. If stereo images for stereoscopic viewing are generated, the output section 268 generates associated images for the left and right and outputs these as display images. In the case of the head-mounted display 100 constructed for enjoying a display image through a lens, the output section 268 may correct the display image by taking into account distortion from this lens.

Figure 6:
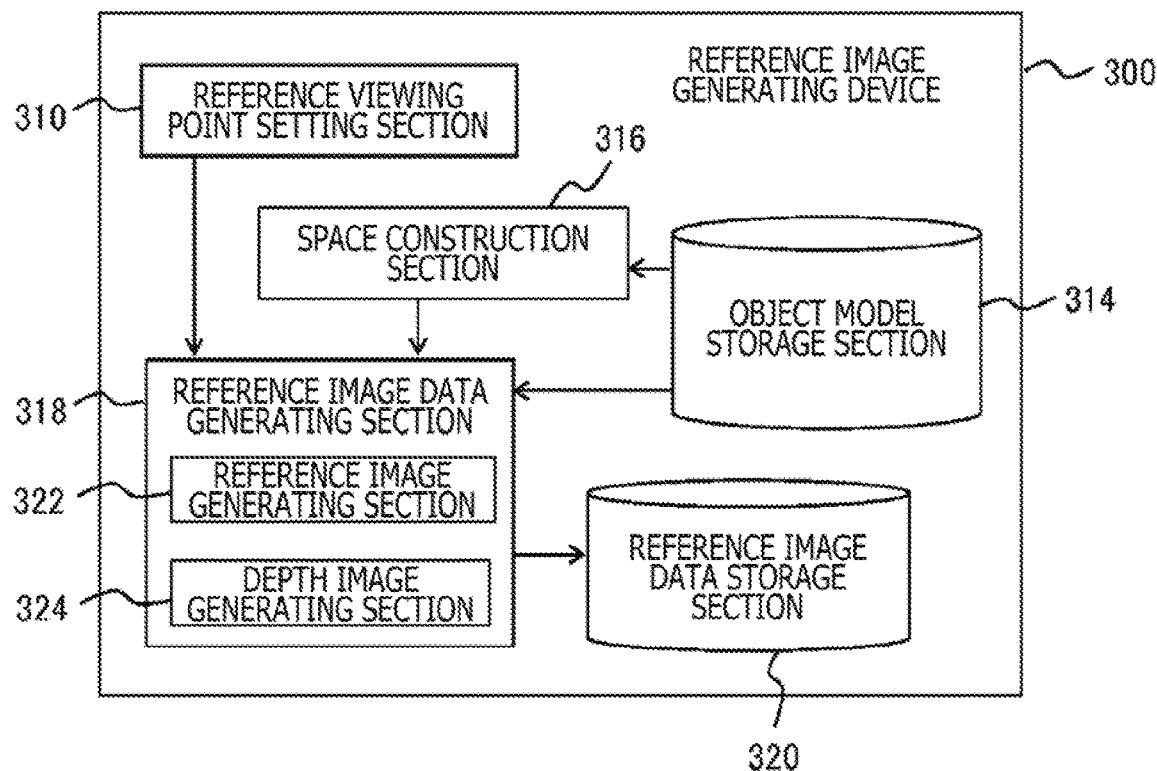
FIG. 6 is a view depicting functional blocks of a device for generating reference image data according to the present embodiment.

FIG. 6 depicts functional blocks of a device for generating reference image data, in the case where reference image data is generated by drawing processing. The reference image generating device 300 may be provided as part of the image generating device 200 of FIG. 5, or may be independently provided as a device that generates data stored in the reference image data storage section 256 of FIG. 5. Also, electronic content including the data of the reference images that are thus generated and the object model used for such generation may be stored beforehand on, for example, a recording medium and may be arranged to be capable of being loaded to the main memory in the image generating device 200 during operation. The internal circuit layout of the reference image generating device 300 may be the same as the internal circuit layout of the image generating device 200 depicted in FIG. 4.

The reference image generating device 300 includes a reference viewing point setting section 310 that sets the reference viewing points, a space construction section 316 that constructs the space including the objects for display, a reference image data generating section 318 that generates the data of the reference images for each reference viewing point, based on the space that has thus been constructed, an object model storage section 314 that stores data relating to the object model required for construction of the space, and a reference image data storage section 320 that stores the reference image data that has thus been generated.

The reference viewing point setting section 310 includes the input section 238, the CPU 222, the main memory 226, and so on and sets the positional coordinates of the reference viewing points in the display space. Suitably, a plurality of reference viewing points are distributed so as to cover the range of viewing points which the user could adopt, as described above. The appropriate values of the range or number of such reference viewing points will depend on the configuration of the display space, the purpose of the display, the accuracy required for the display, the processing performance of the image generating device 200, and so on. The reference viewing point setting section 310 may therefore be arranged to accept user input relating to the positional coordinates of the reference viewing points.

The space construction section 316 includes the CPU 222, the GPU 224, the main memory 226, and so on and is used to construct a shape model of the space in which the objects to be displayed are present. This function corresponds to the function of the space construction section 262 depicted in FIG. 5. Meanwhile, the reference image generating device 300 of FIG. 6 employs a modelling technique based on a solid model which takes into account the color and material of the object, in order to accurately draw an image of an object by ray tracing or the like. For this purpose, model data of the object, including information such as color and material, are stored in the object model storage section 314.

The reference image data generating section 318 includes the CPU 222, the GPU 224, the main memory 226, and so on and includes the reference image generating section 322 and a depth image generating section 324. The reference image generating section 322 draws objects to be displayed as viewed from the reference viewing point in question, for each of the reference viewing points that were set by the reference viewing point setting section 310. Suitably, the viewing point during display can be freely altered at all orientations by preparing reference images as 360° panoramic images obtained by, for example, equidistant cylindrical projection. Also, preferably, the viewing direction at the respective reference points is accurately indicated on the reference image, by calculation of the propagation of light rays over time.

The depth image generating section 324 generates a depth image corresponding to the reference image generated by the reference image generating section 322. Specifically, the distances (depth values) from the view screen of the object represented by the pixels of the reference image are found and a depth image is generated by supplying these as pixel values. It should be noted that, if the reference image is taken as a 360° panoramic image, the view screen is a spherical surface, so the depth value is the value of the distance as far as the object in the direction of the normal to this spherical surface. The depth image generated is utilized in selection of the reference image to be employed when determining the pixel values of the display image. The reference image data generating section 318 stores the data of the reference image and of the depth image that have thus been generated in the reference image data storage section 320, in association with the positional coordinates of the reference viewing point.

Figure 7:
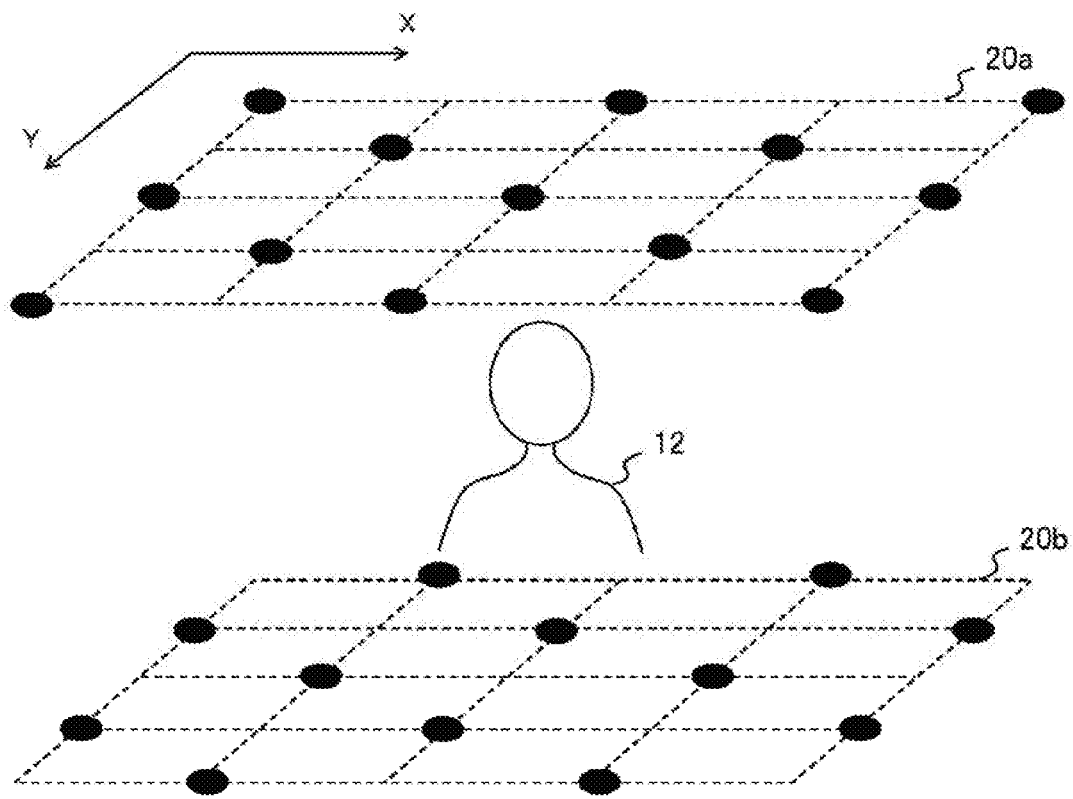
FIG. 7 is a view depicting an example of setting a reference viewing point according to the present embodiment.

FIG. 7 depicts an example of setting a reference viewing point. In this example, a plurality of reference viewing points are respectively set, as indicated by the black circles, on a horizontal plane 20a at the height of the user's eyes when the user 12 is standing, and on a horizontal plane 20b at the height of the user's eyes, when the user is sitting. As an example, the horizontal plane 20a may be 1.4 m from the floor and the horizontal plane 20b may be 1.0 m from the floor. Also, a range of movement commensurate with the display content may be assumed in the left/right direction (X axis direction in the figure) and the forward/rearward direction (Y axis direction in the figure), centered on the reference position (home position) of the user, and the reference viewing points may be distributed in corresponding rectangular regions on the horizontal planes 20a and 20b.

In this example, the reference viewing points are arranged alternately at intersections of lattices obtained by respectively dividing the rectangular region into four equal parts in the X-axis direction and Y-axis direction. Also, they are arranged in offset fashion so that the reference viewing points in the upper and lower horizontal planes 20a and 20b do not overlap. As a result, in the example depicted in FIG. 7, 13 points are set in the upper horizontal plane 20a and 12 points are set in the lower horizontal plane 20b, making a total of 25 reference viewing points.

However, this does not mean that the distribution of reference viewing points is restricted to these, and the reference points can be distributed on a plurality of planes including, for example, vertical planes, or can be distributed on curved planes such as spherical planes. Also, the distribution may be nonuniform, with reference viewing points being distributed with higher density in ranges where the probability of the user being located is higher than in other ranges. Also, in cases where movement is occurring whereby the object being displayed is shifting or deforming, the reference viewing points may also be made to move correspondingly. In this case, the reference images for the respective reference viewing points constitute data of video images reflecting the movement in question.

Also, it may be arranged to prepare dedicated reference images by setting a plurality of reference viewing points so as to surround a specified object, and to combine these when generating a display image of the entire space including the object in question. In this case, the image generating device 200 employs reference images dedicated to the object in question, these being separately prepared in determination of the pixel values, after projecting a mesh of the object in question onto the view screen, in the same way as in the case of other images. By proceeding in this way, in the case of, for example, an important object or an object having a high probability of being approached and observed, it is possible to achieve more detailed representation, and to move or deform only this specified object, without increasing the amount of reference image data.

Figure 8:
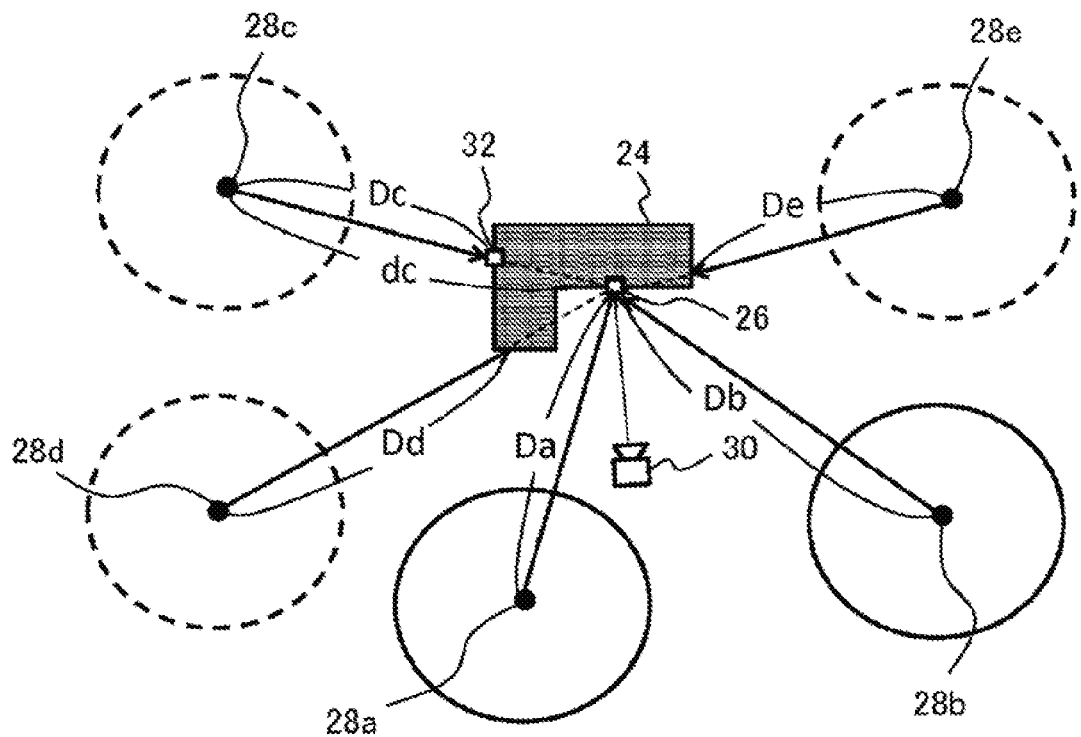
FIG. 8 is a view given in explanation of a technique for selecting a reference image used for determination of pixel values of a display image, by a pixel value determination section according to the present embodiment.

FIG. 8 is a view given in explanation of a technique whereby the pixel value determination section 266 of the image generating device 200 selects a reference image used for determination of the pixel values of the display image. This figure depicts a bird's eye view of the display space, including the object 24. In this space, five reference viewing points 28a to 28e are set and the data of the respective reference images are generated. In this figure, circles centered on the reference viewing points 28a to 28e indicate diagrammatically the screen plane of reference images prepared for a panoramic image of the whole sky.

If the user viewing point is assumed to be at the position of a virtual camera 30 during image display, the projection section 264 determines a view screen so as to correspond with this virtual camera 30, and projects a model shape of the object 24 thereon. The correspondence relationship of pixels in the display image with a position on the surface of the object 24 is thereby identified. Then, when, for example, determining the value of a pixel representing an image of a point 26 on the surface of the object 24, the pixel value determination section 266 first of all specifies the reference image in which this point 26 is displayed as an image.

Since the positional coordinates of the respective reference viewing points 28a to 28e and of the point 26 in the world coordinate system are already known, the distances thereof can easily be found. In the figure, these distances are indicated by the length of the line segments joining the reference viewing points 28a to 28e and the point 26. Also, if the point 26 is back-projected onto the view screen for each reference viewing point, the position of the pixel at which an image of the point 26 should appear in each reference image can also be specified. On the other hand, depending on the position of the reference viewing point, the image may sometimes not appear at this position in the reference image, due to the point 26 being behind the object or hidden by an object in front.

At this point, the pixel value determination section 266 confirms a depth image corresponding to each reference image. The pixel values of the depth image indicate the distance from the screen plane of the object appearing as an image in the corresponding reference image. Consequently, by comparing the distance from the reference viewing point to the point 26 with the depth value of the pixel at which the image of the point 26 in the depth image should appear, it is determined whether or not the image in question is an image of the point 26.

For example, since, on the line of sight to the point 26 from the reference viewing point 28c, the point 32 is behind the object 24, the image of the point 32 is in fact represented as the pixel at which an image of the point 26 should appear in the corresponding reference image. Consequently, the value indicated by the pixel of the corresponding depth image is the distance to the point 32 and the distance Dc obtained by conversion to a value obtained by taking the reference viewing point 28c as the starting point is clearly smaller than the distance dc to the point 26 calculated from the coordinate value. Accordingly, if the difference between the distance Dc obtained from the depth image and the distance dc to the point 26 obtained from the coordinate value is equal to or greater than a threshold value, the reference image in question is excluded from calculation of the value of the pixel value representing the point 26.

Likewise, if the distances Dd and De of the corresponding pixel obtained from the depth image of the reference viewing points 28d and 28e to the object have a difference equal to or greater than a threshold value, with respect to the distance from the respective reference viewing points 28d and 28e to the point 26, they are excluded from the calculation. On the other hand, it is possible to identify by means of threshold value determination that the distances Da and Db to the object of the corresponding pixel obtained from the depth images of the reference viewing points 28a and 28b are substantially the same as the distances from the respective reference viewing points 28a and 28b to the point 26. The pixel value determination section 266 selects the reference image to be employed for calculation of the pixel value for each pixel of the display image, by performing screening in this way, using the depth value.

While five reference viewing points are depicted by way of example in FIG. 8, in fact, as depicted in FIG. 7, comparison is performed using depth values for all of the distributed reference viewing points. In this way, display images of high precision can be drawn. On the other hand, referring to about 25 depth images and reference images in respect of all the pixels of the display image may give rise to a non-negligible load, depending on the processing performance of the device. Accordingly, the number of reference images used as selection candidates may be narrowed down by using a prescribed standard, prior to selection of a reference image to be used for determining the pixel value, as described above. For example, reference viewing points may be extracted that are present within a prescribed range from the virtual camera 30, and selection processing limited to the reference images from these may be executed using the depth value.

In this process, the upper limit of the number of reference viewing points which are extracted may be set as 10 reference viewing points or 20 reference viewing points, for example, and the range of reference points may be adjusted, or acceptance/rejection selection may be performed, randomly or in accordance with a prescribed rule, in order to keep the number of extracted reference viewing points to within this upper limit. Also, the number of reference viewing points that are extracted may be varied, depending on the region on the display image. For example, if virtual reality is implemented using a head-mounted display, it is desirable to draw images with higher accuracy than peripheral regions, in order to ensure that the central region of the display image coincides with the direction of the user's line of sight.

Accordingly, a somewhat large number of reference viewing points (reference images) may be selected as candidates in respect of pixels that are in a prescribed range from the center of the display image, and the number of selection candidates may be reduced in respect of pixels that are outside this range. For example, it is feasible to employ about 20 reference images as selection candidates in the central region and employ about 10 in the peripheral region. However, the number of regions is not restricted to two, and three or more regions could be employed. Also, manner of definition of the regions is not restricted to dependence on the distance from the center of the display image and it would also be feasible to define the regions dynamically, in accordance with being a region or the like relating to the image of an object of interest. In this way, display image drawing can be achieved under optimum conditions taking into account the processing performance of the device, the accuracy required for the display, the content of the display, and the like, by controlling the number of reference images that are referred to, in accordance with some factor other than whether or not an image of the object is projected.

Figure 9:
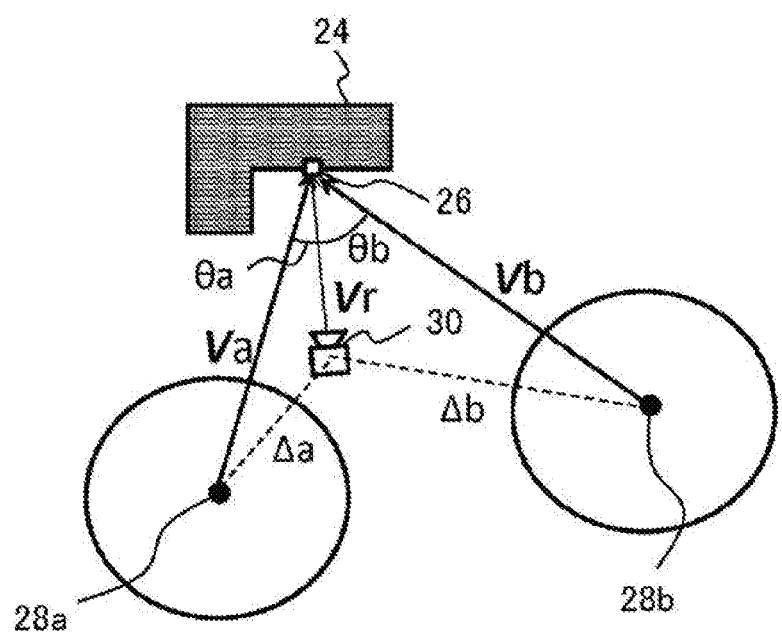
FIG. 9 is a view given in explanation of a technique for determining pixel values of a display image by the pixel value determination section according to the present embodiment.

FIG. 9 is a view given in explanation of a technique for determining the pixel values of display images by the pixel value determination section 266. Let us assume that it has been established that, as depicted in FIG. 8, the image of a point 26 of an object 24 is represented on the reference images of the reference viewing points 28a and 28b. Basically, the pixel value determination section 266 determines the pixel value of the image of the point 26 in the display image corresponding to the actual viewing point, by blending the pixel values of the images of the point 26 in these reference images.

Here, when it is assumed that the pixel values (color values) of the image of the point 26 in the reference images of the reference viewing points 28a and 28b are respectively $c_1$ and $c_2$, the pixel value C in the display image is calculated as follows.

$$C = w_1 \cdot c_1 + w_2 \cdot c_2$$

Here, the coefficients $w_1$ and $w_2$ are weightings having the relationship $w_1+w_2=1$, i.e., they are weightings representing the percentage contribution to the reference image; these weightings are determined based on the positional relationship of the reference viewing points 28a and 28b and the virtual camera 30 that represents the actual viewing point. For example, the percentage contribution is increased by taking the coefficient thereof as a larger value when the distance from the virtual camera 30 to the reference viewing point is smaller.

In this case, taking the distances from the virtual camera 30 to the reference viewing points 28a and 28b as $\Delta a$ and $\Delta b$, if $\text{sum} = 1/\Delta a^2 + 1/\Delta b^2$ is established, the weighting coefficients can be expressed as the following functions.

$$w_1 = (1/\Delta a^2)/\text{sum}$$

$$w_2 = (1/\Delta b^2)/\text{sum}$$

If the above expressions are generalized by taking the number of reference images employed as N, the identification number of the reference viewing point as i ($1 \leq i \leq N$), the distance from the virtual camera 30 to the ith reference viewing point as Ai, the corresponding pixel value in the respective reference image as $c_i$, and the weighting coefficient as $w_i$, the following expression is obtained. However, it should be noted that this does not imply a restriction to this calculation expression.

$$C = \sum_{i=1}^{N} w_i \cdot c_i \qquad \text{[Math. 1]}$$

$$w_i = \frac{1}{\Delta i^2} \cdot \frac{1}{\text{sum}}, \text{sum} = \sum_{i=1}^{N} \frac{1}{\Delta i^2}$$

If, in the above expression, $\Delta i$ is zero, i.e., if the virtual camera 30 coincides with any of the reference viewing points, the weighting coefficient in respect of the pixel value of the corresponding reference image is taken to be one and the weighting coefficients in respect of the pixel values of the other reference images are taken as zero. In this way, reference images created with high precision with respect to the viewing points in question can be directly reflected in the display image.

Also, the parameter used in calculation of the weighting coefficients is not restricted to distance from the virtual camera to the reference viewing point. For example, it could be based on the angles $\theta a$ and $\theta b$ ($0 \leq \theta a, \theta b \leq 90°$) formed by line of sight vectors Va and Vb from the reference viewing points to the point 26, with a line of sight vector Vr from the virtual camera 30 to the point 26. For example, the weighting coefficient is calculated as follows, using the inner products (Va·Vr) and (Vb·Vr) of the vectors Va and Vb with the vector Vr.

$$w_1 = (Va \cdot Vr)/((Va \cdot Vr)+(Vb \cdot Vr))$$

$$w_2 = (Vb \cdot Vr)/((Va \cdot Vr)+(Vb \cdot Vr))$$

If the above expressions are generalized in the same way as described above by taking the number of reference images employed as N, the line of sight vector from the reference viewing point i to the point 26 as $V_i$, and the weighting coefficient as $w_i$, the following expression is obtained.

$$w_i = \frac{(V_i \cdot V_r)}{\sum_{i=1}^{N} (V_i \cdot V_r)} \quad \text{[Math. 2]}$$

Whichever the case, there is no particular restriction on the specific calculation expression, so long as a calculation rule is introduced such that the weighting coefficient becomes larger as the state of the virtual camera 30 with respect to the point 26 becomes closer to a reference viewing point. It is also possible to determine the weighting coefficient by evaluating "the closeness of a state" multilaterally, from both distance and angle. In addition, it is possible to take into account the surface shape of the object 24 at the point 26. In general, the brightness of reflected light from an object has angular dependence based on the inclination of the surface (i.e., the normal to the surface). Accordingly, the angle formed by the normal vector at the point 26 and the line of sight vector Vr from the virtual camera 30, and the angle formed by the line of sight vectors Va and Vb from the respective reference viewing points with the normal vector in question may be compared, and the weighting coefficient made larger as this difference becomes smaller.

Also, the actual function used to calculate the weighting coefficient may be changed over depending on attributes such as the material or color of the object 24. For example, in the case of a material where the specular reflection component is dominant, the color that is observed has strong directionality and changes considerably depending on the angle of the line of sight vector. On the other hand, in the case of a material where the diffuse reflection component is dominant, the color does not change to a large extent with respect to the angle of the line of sight vector. Accordingly, in the former case, a function may be employed such that the weighting coefficient increases, the closer the line of sight vector of the reference viewing point is to the line of sight vector Vr from the virtual camera 30 to the point 26, and in the latter case, the weighting coefficient may be made the same for all reference viewing points, or a function may be employed such that the angular dependence is smaller than in the case where the specular reflection component is dominant.

Also, for the same reason, in cases of materials where the diffuse reflection component is dominant, the computational load can be restricted by reducing the actual number of reference images which are used to determine the pixel values C of the display image, by decimation, or by employing only reference images having line of sight vectors of angles which are close, with at least a prescribed value, to the actual line of sight vector Vr. If the rule for determining the pixel values C is varied according to object attributes in this way, data indicating the attribute in question, such as the material of the object which this represents, may be stored in association therewith, for each reference image, in the reference image data storage section 256.

With the mode described above, the directionality and so on of the light produced by specular reflection can be made to reflect the display image more accurately, by taking into account the surface shape and/or material of the object. The determination of the weighting coefficient may rely on a combination of any two or more of calculation based on the shape of the object, calculation based on its attributes, calculation based on the distance from the virtual camera to a reference viewing point, and calculation based on the angle formed by the respective line of sight vectors.

Figure 10:
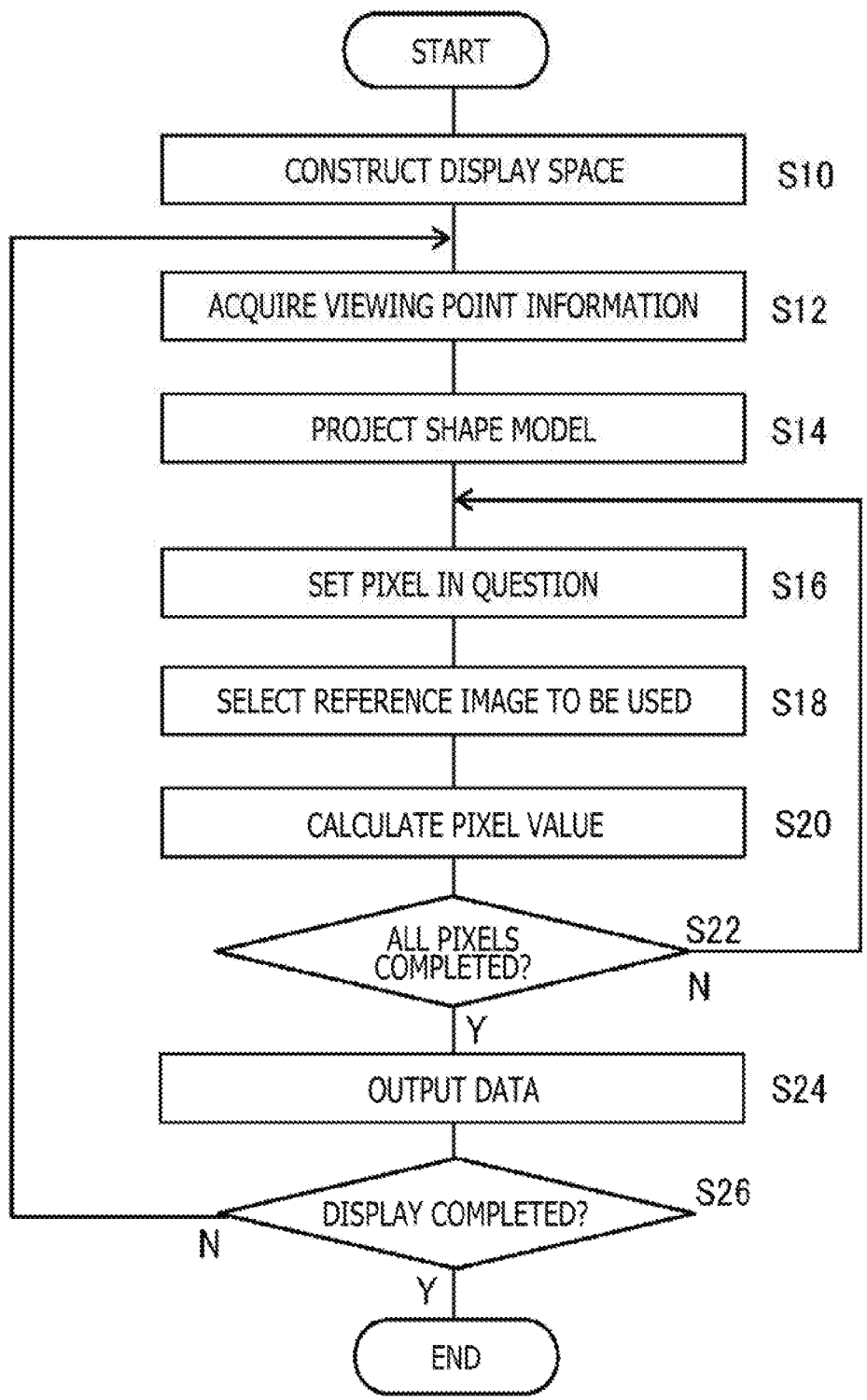
FIG. 10 is a flowchart depicting the processing sequence whereby a display image commensurate with the viewing point is generated by an image generating device according to the present embodiment.

Next, operation of an image generating device capable of implementation by the construction described above will be described. FIG. 10 is a flowchart depicting the processing procedure whereby the image generating device 200 generates a display image commensurate with the viewing point. This flowchart is initiated when an application or the like is started by user operation and the initial image is displayed, and a state in which movement of viewing point is accepted is produced. As described above, various types of information processing may be performed, such as electronic games, in parallel with display processing which is depicted. First of all, the space construction section 262 constructs (S10) a three-dimensional space in which the objects to be displayed are present, in a world coordinate system.

Meanwhile, the viewing point information acquisition section 260 specifies (S12) the position of the viewing point and/or the line of sight direction at this time point, based on the position and/or attitude of the user's head. Next, the projection section 264 sets a view screen with respect to the viewing point, and projects (S14) thereon an object present in the display space. As described above, in this processing, it may be arranged to take into account only surface shape, by, for example, perspective transformation of the vertices of a polygon mesh forming a three-dimensional model. Next, the pixel value determination section 266 sets (S16) one pixel of interest among the pixels in the interior of the mesh that has thus been projected, and selects (S18) a reference image to be used for determination of the pixel value thereof.

Specifically, as described above, the reference image in which the point on the object represented by the pixel in question is displayed as an image is determined, based on a depth image of the respective reference images. Then, the pixel value determination section 266 determines the weighting coefficient, based on the positional relationship of the reference viewing points of these reference images and the virtual camera corresponding to the actual viewing points, and/or the shape and material and so on of the object, and then determines (S20) the value of the pixel of interest by, for example, weighted averaging of the corresponding pixel values of the respective reference images. It will be understood by persons skilled in the art that, for the calculation for deriving the pixel value of the pixel of interest from the pixel values of the reference images, various types of statistical processing and/or interpolation processing other than weighted averaging are feasible.

The processing of S18 and S20 is repeated for all of the pixels on the view screen (N in S22, and S16). Once the pixel values of all of the pixels have been determined (Y in S22), the output section 268 outputs (S24) the data in question to the head-mounted display 100 as display image data. It should be noted that, if left-eye and right-eye display images are generated, the processing of S16 to S22 is carried out for these respective images, and is output in a suitable manner. If the display is not required to be terminated, processing for generation of the display image and output thereof is repeated after acquisition of the following viewing point information (N in S26, and S12 to S24). If termination of the display processing is required, all processing is terminated (Y in S26).

It should be noted that, while, in the example of FIG. 10, the pixel values were determined using reference images in respect of all of the pixels, it would be possible to change over the drawing technique, depending on the region on the display image and/or the position of the viewing point. For example, it would be possible to perform conventional texture mapping exclusively in respect of the image of an object for which there is no need for a change of light or hue due to shifting of the viewing point. Also, in some cases, such as reflected light of high directionality, it may not be possible to completely represent a state that is observed solely at local viewing points, from surrounding reference images. Basically, accuracy of drawing can be improved by increasing the number of reference viewing points, but the amount of data prepared for use as reference images can be reduced by changing over to drawing using ray tracing only when the viewing points fall within the range in question.

With the present embodiment as described above, in technology for displaying an image from any viewing point, image data is prepared beforehand in respect of preset reference viewing points. Thus, when the display image is drawn, the pixel values of the display image are determined by acquiring the values of the pixels representing the same object, from the reference images which were prepared beforehand. For calculation of the pixel values, a rule is introduced based on the positional relationship of the actual viewing point and the reference viewing point and/or object attributes. The reference images can be generated over time with different timing from the display corresponding to the viewing points, so high-quality reference images can be prepared. During display, by extracting values from these high-quality images, high-quality images can be provided without taking time.

Also, by preparing reference images by setting a plurality of reference viewing points in the assumed range of movement of the actual viewing point, and combining the pixel values thereof in accordance with the positional relationships of the viewing points and/or object attributes, display images can be drawn with stable accuracy in respect of any viewing points. For example, when viewing point shifting takes place from the position of a given reference viewing point to the position of another reference viewing point, the hue can be changed in seamless fashion from the reference image corresponding to the former to the reference image corresponding to the latter. Also, a high degree of freedom in regard to position and/or direction of the viewing point can be imparted by arranging for the reference images to be whole-sky panoramic images centered on respective reference viewing points. As a result, a high-quality image can be displayed, with good responsiveness to any viewing points, making it possible to realize image display offering a stronger feeling of presence.

Embodiments of the present invention have been described above. It will be understood by persons skilled in the art that the embodiments are merely examples and various modified examples can be achieved by combining constituent elements and processing processes thereof, and that such modified examples are within the scope of the present invention.

REFERENCE SIGNS LIST

100 Head-mounted display, 200 Image generating device, 222 CPU, 224 GPU, 226 Main memory, 236 Output section, 238 Input section, 254 Object model storage section, 256 Reference image data storage section, 260 Viewing point information acquisition section, 262 Space construction section, 264 Projection section, 266 Pixel value determination section, 268 Output section, 300 Reference image generating device, 310 Reference viewing point setting section, 314 Object model storage section, 316 Space construction section, 318 Reference image data generating section, 320 Reference image data storage section, 322 Reference image generating section, 324 Depth image generating section.

INDUSTRIAL APPLICABILITY

As described above, the present invention is applicable to an image generating device, a display device, an image reproducing device, a game device, various kinds of information processing devices such as a personal computer, an information processing system including these devices, and the like.

The invention claimed is:

1. An image generating device comprising:
a reference image data storage section that stores data of a plurality of reference images, each representing an image when a space constructed by using a three-dimensional model of an object is viewed from a respective prescribed reference viewing point;
a viewing point information acquisition section that acquires information relating to a viewing point at a user-designated location in the space;
a projection section that represents on a plane of a display image a position and a shape of an image of the object when the space is viewed from the user-designated location viewing point;
a pixel value determination section that determines values of pixels constituting the image of the object in the display image, using values of pixels representing a same image in the reference images; and
an output section that outputs the data of the display image;
wherein a spatial distribution of the reference viewing points with respect to the space is of a higher density in ranges where a probability of the user-designated location being located is higher than in other ranges; and
wherein when movement is occurring whereby the object is shifting, reference images for the reference viewing points include data of video images reflecting the movement, such that the reference viewing points are also made to move correspondingly; and
wherein when the object has a higher probability of being observed than other objects moving in the space, movement of the higher probability object in the space is represented in more detail than movement of the other objects without increasing reference image data, by prioritizing representing movement of the higher probability object over representing movement of the other objects when combining reference images.

2. The image generating device according to claim 1, wherein
the reference image data storage section stores data of the plurality of the reference images in respect of the plurality of the reference viewing points; and
the pixel value determination section determines the value of pixels constituting the image of the object, using values of pixels in the plurality of the reference images.

3. The image generating device according to claim 2, wherein the pixel value determination section finds a value of a subject pixel used to determine a value in the display image using a rule based on a material of the object represented by the pixel.

4. The image generating device according to claim 1, wherein the pixel value determination section determines the values of pixels constituting the image of the object using a rule based on positional relationships of the viewing point acquired by the viewing point information acquisition section and the reference viewing points.

5. The image generating device according to claim 4, wherein the pixel value determination section further finds a value of a subject pixel used to determine a value in the display image using a rule based on a normal vector of an object surface represented by the pixel.

6. The image generating device according to claim 1, wherein
the reference image data storage section further stores data of a depth image corresponding to one of the reference images, and
the pixel value determination section selects the reference image used for determination of a value of a subject pixel used to determine a value in the display image, by comparing a distance from one of the reference viewing points to the position on the object represented by the pixel with a depth value indicated by the corresponding pixel in the depth image.

7. The image generating device according to claim 6, wherein the pixel value determination section alters the number of reference images used as candidates for determining pixel values, in accordance with a region on the display image to which the pixel in question belongs.

8. The image generating device according to claim 1, wherein the reference image data storage section stores data of the reference images in respect of the plurality of the reference viewing points distributed by a prescribed rule on a plurality of horizontal planes having different heights.

9. The image generating device according to claim 1, wherein the pixel value determination section changes over whether or not one of the reference images is employed in determination of a value of a pixel of the display image, depending on a range of viewing points acquired by the viewing point information acquisition section.

10. The image generating device according to claim 1, wherein the pixel value determination section changes over whether or not one of the reference images is employed in determination of a value of a pixel constituting the image of the object, depending on the object.

11. The image generating device according to claim 1, wherein
the reference image data storage section further stores data of dedicated reference images representing images when a specified object is seen from a prescribed reference point, and
the pixel value determination section determines a value of a pixel constituting an image of the specified object in the display image, using a value of a pixel in the dedicated reference image.

12. The image generating device according to claim 1, further comprising: a reference image generating device receiving settings of the reference viewing points, generating data of reference images representing the image in the space when seen from the reference viewing point in question, and storing the generated data in the reference image data storage section.

13. A method of generating an image to generate a display image representing a space constructed by using a three-dimensional model of an object, the method comprising:
acquiring information relating to a viewing point at a user-designated location in the space;
representing on a plane of a display image a position and a shape of an image of the object when the space is viewed from the user-designated location viewing point;
reading data of a reference image in question from a memory that stores the data of a plurality of reference images, each representing an image when the space is viewed from a respective prescribed reference viewing point, and determining values of pixels constituting the image of the object in the display image, using values of pixels representing a same image in the reference images; and
outputting data of the display image;
wherein a spatial distribution of the reference viewing points with respect to the space is of a higher density in ranges where a probability of the user-designated location being located is higher than in other ranges; and
wherein when movement is occurring whereby the object is shifting, reference images for the reference viewing points include data of video images reflecting the movement, such that the reference viewing points are also made to move correspondingly; and
wherein when the object has a higher probability of being observed than other objects moving in the space, movement of the higher probability object in the space is represented in more detail than movement of the other objects without increasing reference image data, by prioritizing representing movement of the higher probability object over representing movement of the other objects when combining reference images.

14. A non-transitory, computer readable storage medium containing a computer program, which when executed by a computer, causes the computer to carry out actions to generate a display image representing a space constructed by using a three-dimensional model of an object, the actions comprising:
acquiring information relating to a viewing point at a user-designated location in the space;
representing on a plane of a display image a position and a shape of an image of the object when the space is viewed from the user-designated location viewing point;
reading data of a reference image in question from a memory that stores the data of a plurality of reference images, each representing an image when the space is viewed from a respective prescribed reference viewing point, and determining the values of pixels constituting the image of the object in the display image, using values of pixels representing the same image in the reference images; and
outputting data of the display image;
wherein a spatial distribution of the reference viewing points with respect to the space is of a higher density in ranges where a probability of the user-designated location being located is higher than in other ranges; and
wherein when movement is occurring whereby the object is shifting, reference images for the reference viewing points include data of video images reflecting the movement, such that the reference viewing points are also made to move correspondingly; and
wherein when the object has a higher probability of being observed than other objects moving in the space, movement of the higher probability object in the space is represented in more detail than movement of the other objects without increasing reference image data, by prioritizing representing movement of the higher probability object over representing movement of the other objects when combining reference images.

* * * * *